United States Patent [19]
Ferguson

[11] 3,818,684
[45] June 25, 1974

[54] AERODYNAMIC PERFORMANCE OF CROSS-FLOW MOWERS

[75] Inventor: Hugo S. Ferguson, Averill Park, N.Y.

[73] Assignee: Reel Vortex, Inc., Poestenkill, N.Y.

[22] Filed: June 30, 1972

[21] Appl. No.: 268,073

Related U.S. Application Data

[63] Continuation-in-part of Ser. No. 783,192, Dec. 12, 1968, Pat. No. 3,673,773.

[52] U.S. Cl. .................... 56/13.3, 56/294, 415/54
[51] Int. Cl. ............................................ A01d 35/24
[58] Field of Search .......... 56/13.1, 13.3, 13.4, 294, 56/249; 415/54

[56] References Cited
UNITED STATES PATENTS

| | | | |
|---|---|---|---|
| 2,836,023 | 5/1958 | Caldwell | 56/249 |
| 3,122,871 | 3/1964 | Frevik et al. | 56/294 |
| 3,325,089 | 6/1967 | Vogler | 415/54 |
| 3,673,772 | 7/1972 | Holzhel | 56/13.1 |
| 3,673,773 | 7/1972 | Ferguson | 56/13.3 |

*Primary Examiner*—Antonio F. Guida
*Attorney, Agent, or Firm*—Pennie & Edmonds

[57] ABSTRACT

In a lawn mower of the cross-flow blower type, employing a cylindrical reel with circumferentially-spaced cutting blades in a blower conduit having upper and lower wall sections with respective portions close to the reel at circumferentially spaced positions separating inlet and outlet regions of the blower, a curved forward extension of the upper wall section is provided which extends forwardly to the portion thereof close to the reel, the lower surface of the extension being concave in cross-section and designed to produce a vortex therebeneath which rotates in a direction opposite to the direction of rotation of the reel. The convex lower surface of the extension is joined to the upper wall section by a relatively sharp convex bend. Behind the reel, the upper wall section extends downwardly with a gradually increasing separation from the reel and then bends sharply away from the reel in a horizontal plane. The lower wall section extends downwardly and rearwardly in the outlet region, at an angle such that a projection of the surface lies behind the reel axis. Flexible sheets extend downwardly from the lower wall section and from the rear end of the upper wall section.

12 Claims, 4 Drawing Figures

AERODYNAMIC PERFORMANCE OF CROSS-FLOW MOWERS

RELATED APPLICATION

This application is a continuation-in-part of application Ser. No. 783,192 filed Dec. 12, 1968, now U.S. Pat. No. 3,673,773 issued July 4, 1972.

BACKGROUND OF THE INVENTION

In the above-identified application a cross-flow mower is described comprising a cylindrical reel having a plurality of circumferentially-spaced cutting blades and a blower conduit cooperating therewith to form a cross-flow blower. The inlet region of the blower opens downwardly with a portion of the reel therein exposed to material to be mowed, and the reel is driven in a rotational direction such that the lower blades move in the normally forward direction of travel of the mower. The cross-flow blower action causes air to flow into at least the lower portion of the inlet region from in front of the mower with a substantial component of velocity tangential to the reel and opposite to the direction of movement of the blades. This enables effective mowing of both short and tall grass, weeds, etc., without the employment of a fixed blade or bed knife in shearing relationship with the reel blades. It is preferred to use helically-curved blades to reduce blower noise, and for other reasons set forth therein.

In the aforesaid application extensions of the upper wall and sides of the blower conduit are shown which extend forwardly and downwardly so as to provide a shield or guard against forwardly thrown objects. In one embodiment the guard first extends horizontally and then downwardly at an angle, with slots in the downward section to allow air to enter the guard. This helps to prevent excessive buildup of grass in the guard which might impair the mowing effectiveness.

It has now been found that by designing the forward extension to produce a stable vortex of substantial magnitude under the extension, the mowing action can be improved. Also, the front of the extension can be lowered to nearly the bottom of the reel so as to improve further the safety of operation.

It has also been found possible to design the portion of the blower conduit immediately behind the reel to reduce the effect of subsequent portions of the discharge region on the blower performance, thereby allowing greater latitude in design of the rear portion of the mower.

SUMMARY OF THE INVENTION

In accordance with the present invention, the housing of a mower of the cross-flow blower type has a curved forward extension of the upper wall of the blower conduit which extends forwardly of the portion of the upper wall which is close to the reel. The rotation of the reel is such that the blades in their lowermost positions move in the normally forward direction of travel of the mower. The lower surface of the forward extension is concave in cross-section and designed to produce a vortex therebeneath which rotates in a direction opposite to the direction of rotation of the reel.

An approximately circular surface (in cross-section) has been found satisfactory, preferably somewhat modified from a true circle, as described hereinafter, to promote self-cleaning. Preferably the curved extension is close to the upper wall section of the blower conduit which is close to the reel, and joined therewith by a relatively sharp convex bend. The front edge of the extension may extend toward the ground nearly to the level of the bottom of the reel, so as to provide a high degree of protection against any objects thrown forward by the blades.

The vortex produced beneath the forward extension causes the incoming air to be compressed somewhat downward and aids in concentrating the major portion of the inflow to the reel at the lower rear portion of the inlet region, thereby enhancing the cutting action. The vortex also tends to lift the grass upwards in the upper portion of the inlet region near the reel, to facilitate cutting the upper portions of the grass.

In accordance with another aspect of the invention, at the outlet of the blower a sharp increase in separation of the upper and lower boundary surfaces is introduced, thereby providing a discontinuity which markedly reduces pressure reflections from the discharge region to the reel region. This reduces adverse effects of the discharge region on blower performance, particularly adverse effects in the flow of air under the reel in the inlet region and in the front vortex described above. Also, greater latitude is allowed in designing the rear portion of the mower.

To this end, the upper wall of the blower conduit extends down behind the reel for a major portion of the upper half of the reel, and gradually separates from the reel. Then the upper wall is bent sharply away from the reel so that the adjacent layer of air from the blower separates from the upper wall at the sharp bend. Desirably, the wall is horizontally disposed behind the sharp bend. Advantageously the rear portion of the lower wall of the blower conduit extends downwardly, preferably at an angle such that a projection of the surface thereof passes rearward of the reel axis.

With this construction, turbulence sets in behind the sharp break in the upper wall on the upper side of the current of air from the blower. Also, with proper construction as explained hereinafter, turbulence may set in beneath the current of air from the blower near the lower wall extension. There is also turbulence farther back in the exhaust region. This turbulence absorbs energy from the high velocity current of air issuing from the blower, and greatly reduces the possibility of reflection of energy back into the reel from the ground or other rearward surfaces.

Other features of the invention will be described in connection with the specific embodiment discussed hereinafter, or will be apparent therefrom.

DESCRIPTION OF THE SPECIFIC EMBODIMENT

The specific embodiment here shown is the same as that shown in application Ser. No. 268,072, filed concurrently herewith by the same inventor. That application is directly principally to the canted arrangement of the reel and adjacent portions of the blower, and to features of the three-wheel suspension, whereas this application is primarily directed to the blower conduit design and related portions of the housing.

It will be understood that the features of the present invention are applicable to the uncanted reel arrangements and mower suspensions of the aforesaid application Ser. No. 783,192 as well as to the canted three-wheel embodiment here shown. They are also applicable to straight blades as well as helically-curved blades, although the latter are preferred.

The general construction of the mower will first be described as in application Ser. No. 268,072, filed concurrently herewith.

Figure 1:
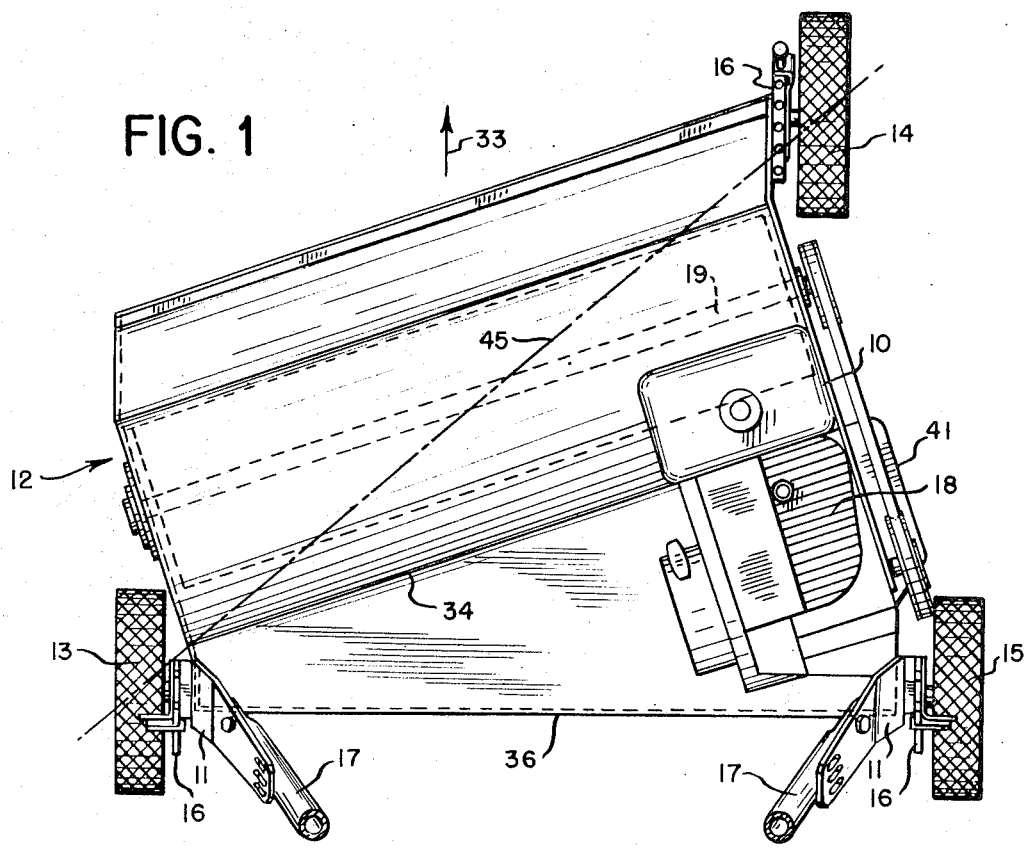
FIG. 1 is a top view of a mower in which a housing in accordance with the present invention is incorporated.
Figure 2:
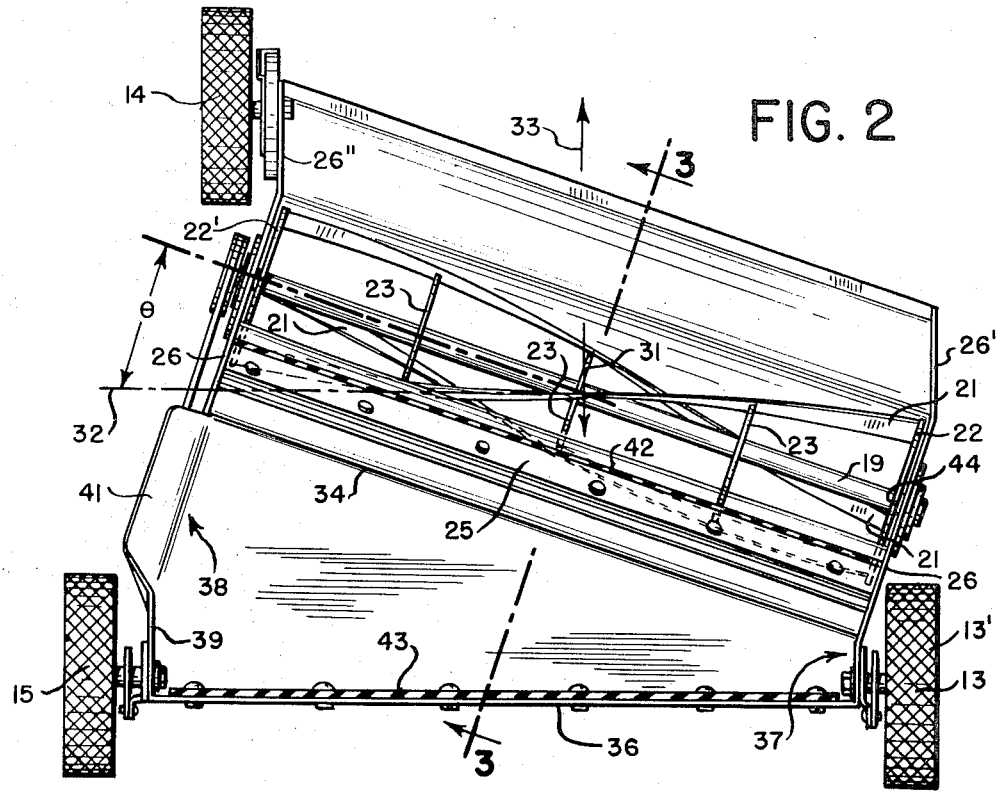
FIG. 2 is a bottom view of the mower.
Figure 3:
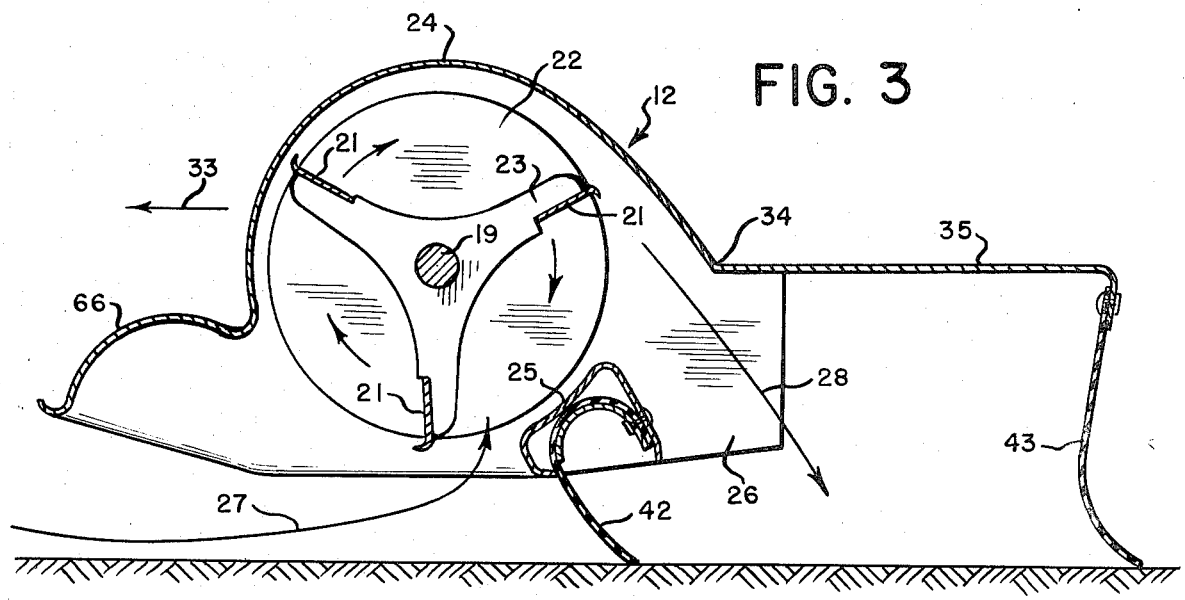
FIG. 3 is a cross-section taken along the line 3—3 of FIG. 2.

Referring to FIGS. 1–3, the mower carriage includes side plate 10 and angle plates 11 attached to the housing generally designated as 12. Wheels 13, 14 and 15 are attached to the side and angle plates and conventional height adjusting fixtures 16 may be employed to permit adjusting the height of the cut. A handle partially indicated at 17 is attached to the carriage in desired manner. Motor 18 drives the axle 19 of the reel through a V-belt and pulley arrangement which need not be described in detail.

As shown in FIG. 2, the reel has a plurality of helically-curved blades 21 spaced circumferentially around the reel. A reel with three blades is here shown, each blade being twisted through approximately 120°. The ends of the blades are attached to circular end plates 22, with intermediate support spiders 23 to provide a strong rigid structure.

As shown in FIG. 3, the housing 12 comprises an upper sheet member 24, a lower member 25, and side plates 26 which form a blower conduit cooperating with the reel to form a cross-flow blower.

The detailed operation of the mower will be described later in connection with FIG. 4. For the moment it suffices to point out that air flows into the inlet region as generally indicated by arrow 27, and to the outlet region as generally indicated by arrow 28.

With helically-curved blades it has been found that air flows into the inlet region substantially perpendicularly to tangents to the helix of the blades in their lowermost positions, as indicated by arrow 31 in FIG. 2. As the reel rotates, successive portions of each blade will reach their lowermost position, and air flow will be perpendicular thereto, as viewed in a horizontal plane. The axis of rotation of the reel, here the axle 19, extends laterally of the carriage and horizontally, but is canted in the horizontal plant at an angle $\theta$ with respect to a perpendicular 32 to the normal direction of travel of the mower indicated by arrow 33. The direction of canting will depend on whether the helix blades are right-handed or left-handed and is selected such that tangents to the helix of the blades in the lowermost positions thereof, such as shown by line 32, are approximately perpendicular to the normal direction of travel of the mower. Although it is preferred to cant the reel such that angle $\theta$ is equal to the helix angle as shown, smaller angles may be employed if desired, and somewhat larger angles are possible.

The portions of the blower conduit adjacent the reel are also canted so as to maintain a proper cross-section for cross-flow blower action.

For reasons explained hereinafter, upper wall 24 of the blower conduit is brought down behind the reel, with a gradually increasing separation therefrom, and then bent sharply outward at 34. Rear section 35 is oriented horizontally, and tapered from one side to the other so that the trailing edge 36 is perpendicular to the direction of travel.

At the narrow side 37 (FIG. 2), the side member 26 may extend to the rear edge 36, and the rear portion bent outward to form a support for wheel 13. At the wide side 38, a sufficiently large opening is provided to allow air to escape without building up an excessive back pressure. On this side, side member 26 terminates somewhat to the rear of bend 34 and an angle bracket 39 is attached at the rear of the housing to support wheel 15, leaving the space therebetween open for outflow of air. A slightly downturned lip 41 directs the air outflow somewhat downward to avoid excessive side blast from the mower.

A sheet of flexible material 42 extends downwardly from member 25 to prevent air flow into the inlet region of the blower from behind the reel, and a sheet of flexible material 43 extends downwardly from the rear end of section 35 to prevent air, grass, dust, etc., from blowing on the operator. These flexible sheets may bend in the opposite direction to that shown when the mower is pulled backward, so as not to interfere with convenient manipulation of the mower.

The motor 18 is mounted on the horizontal section 35, which is substantially below the top of the upper wall 24, thereby reducing the overall height of the mower.

Wheel 13 is mounted behind the rearward end 22 of the canted reel, and at least partially laterally inside the lateral position of end 22. As shown, the outer side 13' of wheel 13 is approximately in alignment with portion 26' of the side wall, so that the mower can be brought close to walls, etc., on that side of the mower. Inasmuch as effective cutting can be obtained quite close to the ends of the blades in their lowermost position indicated as 44, effective cutting may be maintained fairly close to vertical walls or other obstacles.

Wheels 14 and 15 are mounted on the other side in respective forward and rearward positions. Dot-dash line 45 is drawn between the centers of wheels 13 and 14, and crosses the reel axis near the center thereof. Since the reel is supported generally within the points of contact of the three wheels with the ground, if one wheel rides higher or lower due to unevenness of the ground, the effect on the reel movement is somewhat reduced. Thus fairly even mowing of the grass when passing over somewhat uneven ground is promoted, while at the same time keeping the mower compact and economical to construct.

Figure 4:
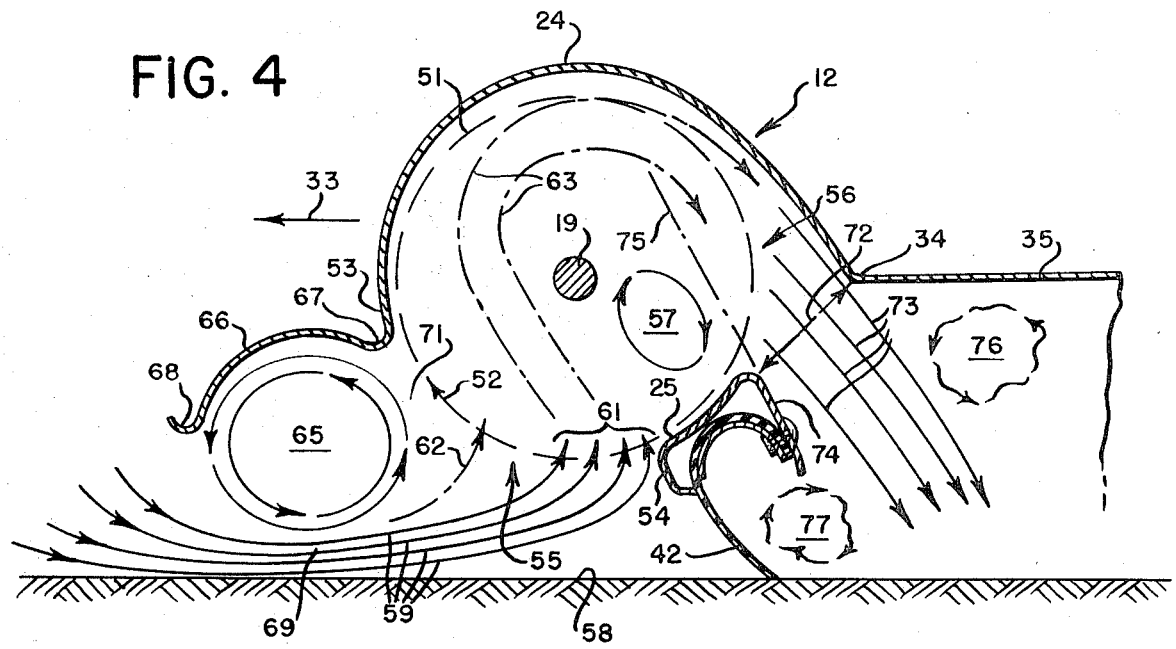
FIG. 4 illustrates diagrammatically the general type of air flow with the cross-sectional configuration of FIG. 3.

Referring now to FIG. 4, the design of the blower conduit in accordance with the present invention will be explained. Here the dashed circle 51 represents the path of travel of the outer sharp hook edges of blades 21, the reel rotating clockwise as indicated by arrow 52 so that the blades in their lowermost positions move in the normal direction of travel of the mower as shown by arrow 33. The upper wall 24 of the blower conduit is close to the reel near point 53, and gradually separates therefrom to point 34. The lower wall 25 of the conduit may be an arc of a circle evenly but closely spaced from the path of travel 52 of the blades. The front edge 54 is turned downward below the path of travel of the blades, so that the blades cannot contact the ground or uneven surfaces.

As explained in application Ser. No. 783,192, there is a vortex component of velocity around the blades in the inlet region generally designated 55 which is opposite in direction to the reel rotation, counterclockwise in this instance. In the outlet region generally designated as 56, the vortex component of velocity is of opposite rotation to that in the inlet region, clockwise in this instance. Thus the region near point 53 may be termed the front vortex breaker, and the lower wall 25 may be termed the rear vortex breaker, since the vortex components around the blades reverse as they pass these regions.

The action of a cross-flow blower is commonly explained in terms of a vortex representing an actual eddy or whirlpool of air at or near the region where the blades pass from the outlet to the inlet regions. Tests indicate that such a vortex is present in the configuration shown, at or near the region 57. Although this may explain the overall functioning of the arrangement as a blower, for lawn mowing purposes it is believed that the presence of vortex components around the blades in the inlet region, but opposite to the direction of rotation of the reel, are more significant.

In a cross-flow mower, where the blower is in proximity to the ground, air flowing into the lower portion of the inlet region from in front of the mower has a substantial component of velocity tangential to the reel and opposite to the direction of movement of the blades thereat. Also the velocity of air flow is greatest in this region.

With proper choice of blade shape and angle of attack, the inflow can be largely concentrated toward the lower rear portion of the inlet region. Inclined hook blades such as shown at 21 in FIG. 3 have been found satisfactory for this purpose.

Thus, in FIG. 4, air enters the inlet region largely toward the lower portion thereof as shown by arrows 59 and bracket 61. A much smaller amount of air enters the remainder of the inlet region, as indicated by the single arrow 62. As shown by arrows 59, there is a substantial component of velocity tangential to the reel, and opposite to the direction of movement of the blades, so that grass to be cut is forced against the blades. This promotes effective mowing.

Tests indicate that the path of travel of the air through the reel is generally Z-shaped, as depicted by arrows 63, although the exact course of travel may vary with detailed design.

Considering now the front vortex 65, the shape of the front extension 66 is selected to promote the generation of the vortex as air flows into the inlet region. It will be understood that the energy creating vortex 65 is obtained from the inflow of air due to the cross-flow blower action described above.

The lower surface of extension 66 is smoothly concave. An approximately circular surface (in crosssection) has been found satisfactory. However, to promote self-cleaning it has been found desirable to slightly reduce the radius of curvature in the direction of rotation of the vortex. Preferably the curved extension is close to the front vortex breaker at 53, and joined therewith by a sharp convex bend at 67. If desired, bend 67 could be brought to a point, but this is structurally more difficult. From 67, the extension curves somewhat upward and then downward to lip 68, which is upturned to provide strength and smooth air flow at the leading edge.

The height of the extension 66 may be selected in view of the desired height of cut, resistance to air flow, and the force required to push the mower through the grass. In a mower designed for a nominal 2-inch height of cut, lip 68 may be only slightly above the bottom of the reel, about a half inch in the embodiment shown, so as to provide a high degree of protection against any objects thrown forward by the blades.

Extension 66 is here a continuous metal sheet without perforations, and in any event should be sufficiently imperforate to avoid substantial entry of air which would disturb the production of a stable vortex.

As indicated, the vortex 65 is slightly oval and rotates opposite to the reel rotation, counterclockwise as shown in FIG. 4. The rotating vortex causes the incoming air to be compressed downward somewhat at region 69, thereby aiding in concentrating the major portion of the inflow to the reel to region 61 and enhancing the cutting action. Also, the upward direction of vortex 65 in region 71 tends to lift the grass upwards to facilitate cutting the upper portion thereof. The exact effect will depend on the length and condition of the grass. Short grass may have their tips bent rearwards as they pass lip 68 and then upwards in region 71 so that their tips are severed. Tall flexible grass may be folded over as it passes lip 68, and then the upper portion or fold lifted in region 71 to promote a preliminary cutting action. In either case, the final cutting action will be in region 61.

It is possible to move the curved surface 66 farther forwards if desired, to guard against even lower trajectories of thrown objects, but the overall length of the mower will be increased and the enhancement of the mower operation may be somewhat reduced.

Considering the main portion of the blower conduit, in which the reel rotates, it has been found desirable to make the width of the rear vortex breaker, constituted by lower wall 25 of the conduit, greater than the blade width plus the clearance between the blade and the wall 25, and preferably about twice the blade width plus clearance. This promotes a pressure drop behind the blade as it passes by wall 25, which results in a high velocity of inflowing air in region 61, where the blade enters the inlet region. A downwardly extending skirt 42 of flexible material is attached to wall 25 to prevent air from entering region 61 from the rear of the mower to fill the partial void created as the blades enter region 61, thereby promoting the desired air flow shown by arrows 59. Since skirt 42 is flexible, it can bend in the opposite direction to that shown, when the mower is pulled backward, so as not to interfere with convenient handling.

Tests on mowers including the front vortex 65 showed good cutting action as long as the rear discharge was not impeded. However, direct rearward discharge blows air, grass, dust, etc., on the operator. Thus it is desirable to divert at least air and dust laterally. Although grass may be diverted laterally also, windrowing may occur unless a grass catcher is employed. Without a grass catcher, it was considered more desirable to distribute the grass clippings evenly behind the mower.

In attempting to divert the air, while distributing the clippings evenly behind the mower, it was found that changes might be produced in the air flow both in the front vortex housing and under the reel which would reduce the mowing effectiveness.

In accordance with a further feature of the invention, the rear portion of the blower conduit has been designed so as to reduce the effect of subsequent portions of the discharge area on the blower performance. Thus greater latitude is allowed in designing the rear portion of the mower.

Broadly, at the outlet of the blower a sharp increase in separation of the upper and lower boundary surfaces is introduced, thereby providing a discontinuity which markedly reduces pressure reflections from the discharge region to the reel region.

In FIG. 4, the upper wall 24 of the blower conduit extends down behind the reel for a major portion of the upper half of the reel, here approximately to the level of the reel axis, and gradually separates from the reel. The opening defined by the upper and lower walls at 72, and the side walls of the conduit, has a cross-sectional area sufficient to yield good blower action. The upper wall is then bent sharply away from the reel at 34 so that the layer of air adjacent the downwardly curved portion of wall 24 separates at 34 from the wall section 35. The rear portion 74 of the lower wall extends downwardly from the vortex breaker 25, preferably at an angle such that a projection thereof illustrated by line 75 passes rearward of the reel axis 19.

The main stream of air from the blower travels downwards and rearwards as shown by arrows 73. It is observed that the air stream tends to concentrate toward the outer region thereof, as indicated by the closer spacing of the outer arrows 73. Behind point 34 turbulence sets in, as indicated by the irregular counter-clockwise eddy 76. Below and near the rear vortex breaker turbulence also sets in, as indicated by the irregular clockwise eddy 77. This turbulence is promoted by the discontinuity introduced at the bottom of wall section 74, and its separation from skirt 42. There is also turbulence farther back in the exhaust region. This turbulence absorbs energy from the air stream, and greatly reduces the possiblity of reflection of energy back into the reel from the ground or other rearward surfaces. It is believed that the sharp break in the upper wall at 34 is of primary importance in preventing subsequent portions of the exhaust region from affecting blower performance, although the turbulence in region 77 appears to help materially.

In mowing, grass clippings pass out of the blower in a downward direction and, since they have a much higher momentum than the air, due to their mass, are thrown down on the ground behind the reel. However, the air is expelled laterally by the exhaust chamber comprising tapered rear section 35 of the mower, the flexible skirt 43, and the side opening at 38, as explained in connection with FIGS. 1–3.

The air flow of FIG. 4 are somewhat idealized, since it is impractical to show exact patterns, and in any event they are likely to change somewhat with the detailed design. However, they are believed to be sufficient to give a reasonable representation of the observed results.

As to the exact effect of the airflow patterns in cutting grass, this will depend not only on the detailed design but also on mowing conditions, since it is well known that mower performance varies considerably with type of grass, climate, season of the year, etc., as well as excessive growth if mowing intervals are too long. Accordingly, while the explanation given is believed to be essentially correct for a wide variety of mowing conditions, it cannot be expected to apply to all conditions that may arise.

The detailed design may be changed considerably in practice, since different designers may place different emphasis on the desirable features of a good mower, and engineering compromises may be necessary. It is believed that the foregoing explanation will enable a person skilled in the art to vary the design to suit his predilections. To facilitate the design, it has been found useful to build models with a transparent end wall, and view the flow patterns with the aid of a source of helium-filled soap bubbles of small size, produced by commercially available apparatus.

The invention has been described in connection with a specific embodiment incorporating several features which promote overall performance. It will be understood that some features may be employed, while omitting others, as meets the requirements of a particular application.

I claim:

1. A lawn mower comprising
   a. a carriage,
   b. a cylindrical reel rotatably mounted on said carriage with the axis thereof substantially horizontal and extending laterally of the carriage,
   c. said reel having a plurality of circumferentially spaced laterally extending cutting blades with circumferentially successive blades moving in substantially the same path of travel,
   d. said blades being narrow compared to the length thereof and being spaced from the reel axis to leave the major portion of the interior of the reel free for air flow through the reel transversely thereof,
   e. the cross-section of said blades having at least a portion on the leading side thereof which slopes backwardly and inwardly with respect to the direction of rotation of the reel,
   f. a blower conduit cooperating with said reel to form therewith a cross-flow blower,
   g. said conduit comprising upper and lower wall sections extending laterally along the length of the reel and having respective portions close to the reel at circumferentially spaced positions separating inlet and outlet regions of the blower,
   h. said inlet region opening downwardly with a portion of the reel therein exposed to material to be mowed,
   i. and motor means for driving said reel in a rotational direction such that the lower blades move in the normally forward direction of travel of the mower,
   j. The portions of the mower adjacent the reel being non-shearingly spaced from the path of travel of said blades, wherein the improvement comprises
   k. a curved forward extension of said upper wall section of the blower conduit extending forwardly of said portion thereof close to the reel,
   l. The lower surface of said extension being concave in cross-section and designed to produce a vortex therebeneath rotating in a direction opposite to the direction of rotation of said reel.

2. A mower in accordance with claim 1 in which said concave lower surface of the extension is joined with said upper wall section near said portion close to the reel by a relative sharp convex bend.

3. A mower in accordance with claim 2 in which said concave lower surface extends upwardly and forwardly adjacent said convex bend and then downwardly and forwardly in arcuate cross-section.

4. Apparatus in accordance with claim 1 in which said upper wall section of the blower conduit has a curved portion extending over said reel with a gradually increasing separation therefrom, and a rear portion bending sharply away from the reel.

5. A lawn mower comprising
 a. a carriage,
 b. a cylindrical reel rotatably mounted on said carriage with the axis thereof substantially horizontal and extending laterally of the carriage,
 c. said reel having a plurality of circumferentially spaced laterally extending cutting blades with circumferentially successive blades moving in substantially the same path of travel,
 d. said blades being narrow compared to the length thereof and being spaced from the reel axis to leave the major portion of the interior of the reel free for air flow through the reel transversely thereof,
 e. the cross-section of said blades having at least a portion on the leading side thereof which slopes backwardly and inwardly with respect to the direction of rotation of the reel,
 f. a blower conduit cooperating with said reel to form therewith a cross-flow blower,
 g. said conduit comprising upper and lower wall sections extending laterally along the length of the reel and having respective portions close to the reel at circumferentially spaced positions separating inlet and outlet regions of the blower,
 h. said inlet region opening downwardly with a portion of the reel therein exposed to material to be mowed,
 i. and motor means for driving said reel in a rotational direction such that the lower blades move in the normally forward direction of travel of the mower,
 j. the portions of the mower adjacent the reel being non-shearingly spaced from the path of travel of said blades, wherein the improvement comprises
 k. said upper wall section in the outlet region of the blower conduit having a curved portion extending over said reel with a gradually increasing separation therefrom whereby air flows along said curved portion, and a rear portion bending sharply away from the reel to cause the layer of air flowing adjacent said curved portion to separate from the upper wall at the bend and produce turbulence in the region beneath said rear portion.

6. A mower according to claim 5 in which said curved portion extends downwardly behind said reel for a major portion of the upper half of the reel.

7. A mower according to claim 6 in which said rear portion is substantially horizontal.

8. A mower according to claim 5 in which the rear of said lower wall section of the blower conduit bends downwardly from said reel.

9. A mower according to claim 7 in which the rear of said lower wall section of the blower conduit bends sharply downwardly from said reel at an angle such that a projection of the surface lies rearward of the reel axis.

10. A mower according to claim 5 in which the lower wall section of the blower conduit has a flexible skirt attached thereto extending downwardly to a level substantially below said reel and at least close to the ground level.

11. A mower according to claim 7 in which the lower wall section of the blower conduit has an arcuate portion substantially uniformly spaced from said reel and a rear portion bent sharply downwardly from the reel at an angle such that a projection of the surface lies rearward of the reel axis.

12. A mower according to claim 1 in which said curved portion of the upper wall section extends downwardly behind said reel for a major portion of the upper half of the reel and said rear portion is substantially horizontal, the rear edge of said rear portion being at an angle to the sharp bend in the upper wall section to provide an exhaust chamber increasing in cross-sectional area toward one side of the mower, and a downwardly extending flexible skirt attached to said rear edge.

* * * * *